US011080269B2

(12) United States Patent
Fortney (10) Patent No.: US 11,080,269 B2
(45) Date of Patent: *Aug. 3, 2021

(54) BLOCKCHAIN BASED INTEGRITY CHECKS

(71) Applicant: Science Applications International Corporation, Reston, VA (US)

(72) Inventor: George Fortney, Toms River, NJ (US)

(73) Assignee: Science Applications International Corporation, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,881

(22) Filed: Jun. 16, 2020

(65) Prior Publication Data

US 2021/0026834 A1     Jan. 28, 2021

Related U.S. Application Data (63) Continuation of application No. 16/519,559, filed on Jul. 23, 2019, now Pat. No. 10,726,000.

(51) Int. Cl.
*G06F 16/23*        (2019.01)
*H04L 9/32*         (2006.01)

(52) U.S. Cl.
CPC ...... *G06F 16/2365* (2019.01); *G06F 16/2308* (2019.01); *H04L 9/3239* (2013.01)

(58) Field of Classification Search
CPC . G06F 16/2365; G06F 16/2308; H04L 9/3239
USPC ......................................................... 707/690
See application file for complete search history.

(56) References Cited

U.S. PATENT DOCUMENTS

| 8,949,611 | B1* | 2/2015 | Kimberly | H04L 9/3239 |
| | | | | 713/176 |
| 10,447,483 | B1* | 10/2019 | Su | H04L 9/0643 |
| 10,666,767 | B1* | 5/2020 | Floyd | H04L 9/3239 |
| 2013/0036103 | A1 | 2/2013 | Lawson et al. | |
| 2018/0018723 | A1 | 1/2018 | Nagla et al. | |
| 2018/0342036 | A1 | 11/2018 | Zachary | |
| 2018/0374283 | A1 | 12/2018 | Pickover et al. | |
| 2019/0149324 | A1 | 5/2019 | Kong et al. | |

(Continued)

FOREIGN PATENT DOCUMENTS

GB     2562054 A     11/2018

OTHER PUBLICATIONS

Igor Zikratov et al., "Ensuring data integrity using blockchain technology," 2017 20th Conference of Open Innovations Association (FRUCT), IEEE, 2017, pp. 1-6, https://fruct.org/publications/fruct20/files/Zik2.pdf.

(Continued)

*Primary Examiner* — Kimberly L Wilson
(74) *Attorney, Agent, or Firm* — Banner & Witcoff, Ltd.

(57) ABSTRACT

Systems, apparatuses, and methods are described for determining, based on blockchain, integrity of software and/or data stored on a vehicle. A computing device associated with a vehicle may determine one or more hash values for software and/or data stored on the vehicle. The computing device may receive values from read-only memory associated with the computing device and/or values from a blockchain of a distributed ledger system. The computing device may determine the integrity of the software and/or data based on the one or more hash values, the values from the read-only memory, and/or the values from the blockchain.

20 Claims, 8 Drawing Sheets

(56) References Cited

U.S. PATENT DOCUMENTS

| | | | |
|---|---|---|---|
| 2019/0288847 A1 | 9/2019 | Beckmann et al. | |
| 2019/0295336 A1* | 9/2019 | Jones | G07C 5/085 |
| 2020/0005559 A1 | 1/2020 | Grunbok, II et al. | |
| 2020/0026619 A1* | 1/2020 | Kaji | H04L 63/123 |
| 2020/0073651 A1* | 3/2020 | Rodriguez Bravo | H04L 63/123 |
| 2020/0313885 A1* | 10/2020 | Mondello | H04L 9/3247 |
| 2020/0313898 A1* | 10/2020 | Troia | H04L 63/0492 |

OTHER PUBLICATIONS

Alan Litchfield and Jeff Herbert, "ReSOLV: Applying cryptocurrency blockchain methods to enable global cross-platform software license validation," May 31, 2018, Cryptography 2.2 (2018): 10, pp. 1-24, https://www.mdpi.com/2410-387X/2/2/10/pdf.

Satoshi Nakamoto, "Bitcoin: A Peer-to-Peer Electronic Cash System," bitcoin.org, pp. 1-9, https://bitcoin.org/bitcoin.pdf.

Wikipedia contributors, "Cryptographic hash function," Wikipedia, The Free Encyclopedia, pp. 1-11, https://en.wikipedia.org/wiki/Cryptographic_hash_function (accessed Jul. 31, 2019).

Brian Curran, "What is a Merkle Tree? Beginner's Guide to this Blockchain Component," Jul. 9, 2018, blockonomi, pp. 1-18, https://blockonomi.com/merkle-tree/ (accessed Jul. 31, 2019).

Robert Lie, "Merkle Tree," Mobilefish.com, pp. 1-14, https://www.mobilefish.com/download/iota/merkle_tree_part18.pdf.

Robert Lie, "IOTA Tutorial 18, Merkle Tree," May 22, 2019, iota-news.com, pp. 1-4, https://iota-news.com/iota-tutorial-18-merkle-tree/ (accessed Jul. 31, 2019).

"IOTA tutorial," Mobilefish.com, pp. 1-15, https://www.mobilefish.com/developer/iota/iota_quickguide_tutorial.html (accessed Jul. 31, 2019).

\* cited by examiner

BLOCKCHAIN BASED INTEGRITY CHECKS

CROSS-REFERENCE TO RELATED APPLICATIONS

This application is a continuation of and claims priority to U.S. patent application Ser. No. 16/519,559, filed Jul. 23, 2019, and entitled "BLOCKCHAIN BASED INTEGRITY CHECKS," which is hereby incorporated by reference in its entirety.

BACKGROUND

Software may be installed on a vehicle to perform various functions associated with the vehicle. Various types of data may also be stored on the vehicle. The software and/or data stored on the vehicle may be important to the operation of the vehicle, and/or to the missions that the vehicle may be used to carry out. The software and/or data may be subject to access by malicious users and/or unauthorized tampering. If the integrity of the software and/or data stored on the vehicle is not verified, it may lead to abnormal operation of the vehicle and/or may jeopardize the missions that the vehicle may be used to carry out.

SUMMARY

The following summary presents a simplified summary of certain features. The summary is not an extensive overview and is not intended to identify key or critical elements.

Systems, apparatuses, and methods are described for determining integrity of software and/or data stored on a vehicle. A computing device associated with a vehicle may comprise one or more processors and memory storing instructions that, when executed by the one or more processors, cause the computing device to perform functions described herein. The computing device may determine one or more first hash values for a collection of information stored on the computing device. The computing device may receive, from read-only memory associated with the computing device, one or more second hash values. The computing device may, based on determining that the one or more first hash values correspond to the one or more second hash values, send, to a second computing device storing at least a portion of a blockchain of a distributed ledger system, a request for one or more third hash values associated with the computing device. The computing device may receive, from the second computing device, the one or more third hash values. The computing device may determine, based on the one or more first hash values and the one or more third hash values, whether to perform an operation associated with the collection of information.

The computing device may determine one or more fourth hash values for a second collection of information stored on the computing device. The computing device may receive, from the read-only memory associated with the computing device, the one or more second hash values. The computing device may, based on determining that the one or more fourth hash values are different from the one or more second hash values, suspend an operation of the computing device.

The computing device may, based on determining that the one or more first hash values correspond to the one or more third hash values, perform an operation associated with the collection of information. The collection of information may comprise software. The computing device may perform the operation associated with the collection of information by executing the software. The computing device may, based on determining that the one or more first hash values are different from the one or more third hash values, suspend an operation of the computing device. The computing device may, based on comparing the one or more first hash values and the one or more third hash values, determine a compromised part of the collection of information.

The one or more first hash values may comprise a first root hash value of a first Merkle tree for the collection of information. The one or more second hash values may comprise a second root hash value of a second Merkle tree stored in the read-only memory associated with the computing device. The one or more third hash values may comprise a third root hash value of a third Merkle tree, associated with the computing device, stored in the blockchain of the distributed ledger system. The computing device may, based on receiving the collection of information, generate the one or more third hash values. The computing device may register, to the blockchain of the distributed ledger system, the one or more third hash values.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
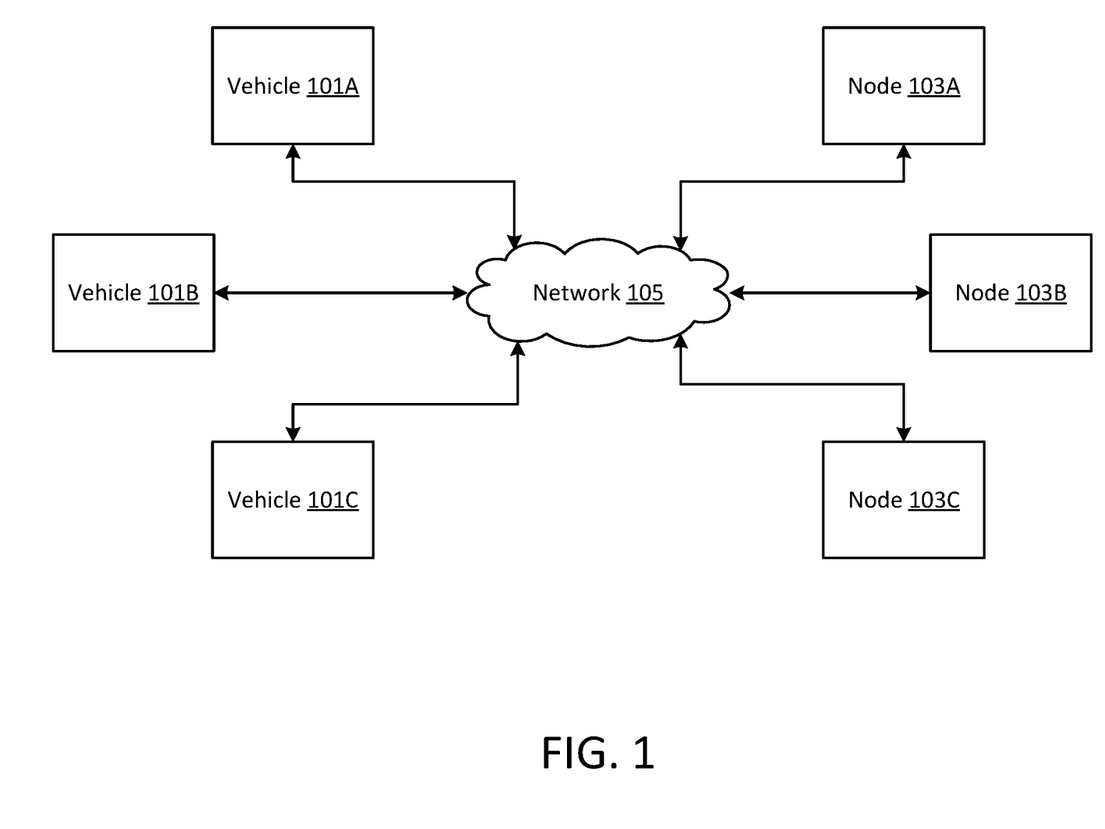
FIG. 1 shows an example system in which various features described herein may be implemented.

FIG. 1 shows an example system in which various features described herein may be implemented. The system may comprise one or more vehicles (e.g., vehicles 101A-101C), one or more nodes (e.g., nodes 103A-103C), and one or more networks (e.g., network 105). The vehicles 101A-101C and the nodes 103A-103C may communicate with each other via the network 105. A vehicle of the vehicles 101A-101C may comprise, for example, a military vehicle, military aircraft, military vessel, tank, submarine, helicopter, car, motorcycle, van, bicycle, scooter, drone, truck, tow truck, bus, ship, boat, plane, recreational vehicle, and/or any other type of vehicle. A node of the nodes 103A-103C may comprise any type of computing device, such as a server, computer, mobile device, and/or the like.

The network 105 may comprise a single network or a collection of multiple connected networks. The network 105 may comprise one or more of any of various types of information distribution networks, such as, without limitation, a satellite network, a cellular network, a Wi-Fi network, an Ethernet network, a telephone network, an optical fiber network, a coaxial cable network, a hybrid fiber coax network, and/or the like. The network 105 may comprise a local area network (LAN), a wide area network (WAN), and/or the like. The network 105 may comprise an Internet Protocol (IP) based network (e.g., the Internet). The network 105 may use a plurality of interconnected communication links to connect the vehicles 101A-101C and the nodes 103A-103C.

As described in detail below, a vehicle of the vehicles 101A-101C may include and/or be associated with computing device(s) configured to store and execute instructions. For example, software for controlling operation of the vehicle may be installed on the computing device(s). The software may comprise, for example, executables, libraries (e.g., dynamic-link library (DLL)), and/or other components. The computing device(s) of the vehicle may additionally or alternatively store other types of information, such as an identifier of the vehicle (e.g., a bumper number of the vehicle, a serial number of the vehicle, a vehicle identification number (VIN) of the vehicle, etc.), information of the vehicle operator(s), etc. The software and/or data stored on the vehicle may be subject to unauthorized access or modification. For example, a malicious hacker may attempt to modify the software stored on the vehicle in order to adversely affect the operation of the vehicle. To ensure the integrity of the software and/or data stored on the vehicle, an integrity check service based on blockchain may be used for the vehicle. The vehicles (e.g., the vehicles 101A-101C) and the nodes (e.g., the nodes 103A-103C) may establish a distributed ledger system for storing values (e.g., hash values of software and/or data stored on vehicles). The values may be used to verify the integrity of software and/or data stored on the vehicles. As described in detail below, the distributed ledger system may comprise a blockchain including one or more linked blocks storing the values, and each of the vehicles and/or nodes may store a copy of the entirety or a portion of the blockchain.

Figure 2A:
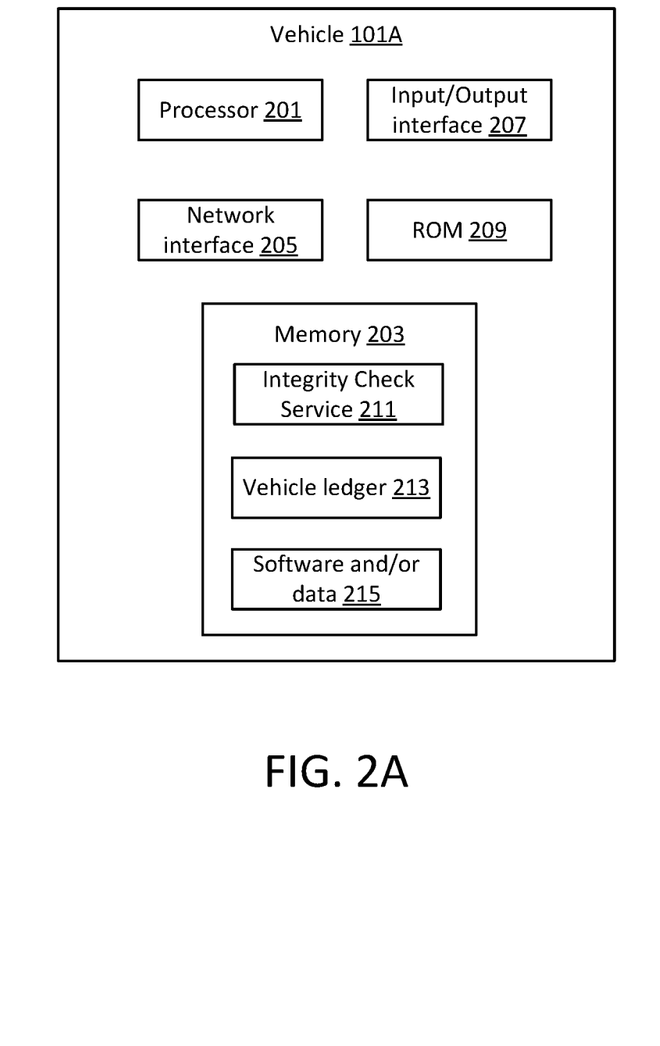
FIG. 2A shows an example of a vehicle.

FIG. 2A shows, in block diagram form, an example of the vehicle 101A. The vehicle 101A may comprise one or more processors (e.g., processor 201), memory 203, one or more network interfaces (e.g., network interface 205), one or more input/output interfaces (e.g., input/output interface 207), and read-only memory (ROM) 209. The vehicles as described herein (e.g., the vehicles 101B-101C) may similarly comprise these components.

The processor 201 may execute instructions of a computer program to perform any of the functions described herein. The instructions may be stored in the memory 203, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 205 may comprise, for example, a network card, and may be configured to communicate with a network (e.g., the network 105). The network interface 205 may be a wireless interface, a wired interface, or a combination of the two. The network interface 205 may comprise a modem configured to communicate via the network 105. The input/output interface 207 may comprise various interface units for reading, writing, displaying, and/or printing data, such as a mouse, keyboard, touch screen, microphone, display, speaker, printer, and/or the like. Additionally or alternatively, the vehicle 101A may comprise a location-detecting device, such as a global positioning system (GPS) microprocessor, which may be configured to receive and process global positioning signals and determine, with possible assistance from an external server and antenna, a geographic position of the vehicle 101A.

The memory 203 may store computer-readable instructions that, when executed by one or more processors (e.g., the processor 201), may cause the vehicle 101A to perform any of the functions described herein. The memory 203 may store, for example, an integrity check service 211, a vehicle ledger 213, and software and/or data 215. The software and/or data 215 may comprise, for example, software for controlling the operation of the vehicle 101A (e.g., including executables and libraries) and static data stored on the vehicle 101A (e.g., vehicle identifier, vehicle operator information, etc.). The integrity check service 211 may be configured to validate the integrity of the software and/or data 215, for example, when the vehicle 101A is powered on. The integrity check service 211 may calculate hash value(s) for the software and/or data 215 stored on the vehicle 101A, and may compare the calculated hash value(s) with hash value(s) stored in the ROM 209 and/or hash value(s) stored in a distributed ledger system. Based on the comparison, the integrity check service 211 may determine the integrity of the software and/or data 215. The vehicle ledger 213 may comprise, for example, the entirety or a portion of a blockchain of the distributed ledger system.

Figure 2B:
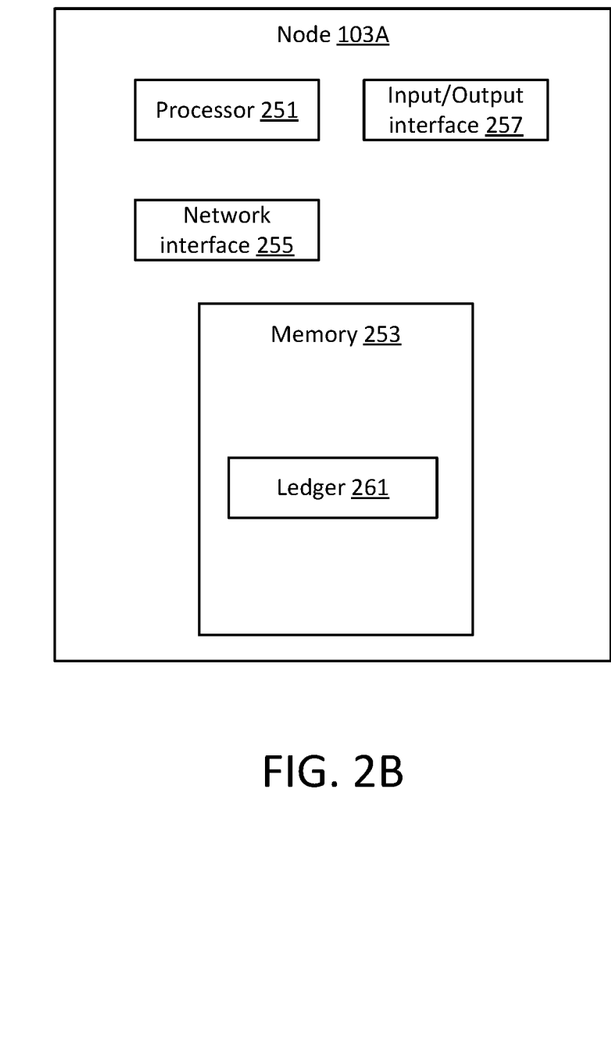
FIG. 2B shows an example of a node.

FIG. 2B shows, in block diagram form, an example of the node 103A. The node 103A may comprise one or more processors (e.g., processor 251), memory 253, one or more network interfaces (e.g., network interface 255), and one or more input/output interfaces (e.g., input/output interface 257). The nodes as described herein (e.g., the nodes 103B-103C) may similarly comprise these components.

The processor 251 may execute instructions of a computer program to perform any of the functions described herein. The instructions may be stored in the memory 253, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 255 may comprise, for example, a network card, and may be configured to communicate with a network (e.g., the network 105). The network interface 255 may be a wireless interface, a wired interface, or a combination of the two. The network interface 255 may comprise a modem configured to communicate via the network 105. The input/output interface 257 may comprise various interface units for reading, writing, displaying, and/or printing data, such as a mouse, keyboard, touch screen, microphone, display, speaker, printer, and/or the like. Additionally or alternatively, the node 103A may comprise a location-detecting device, such as a global positioning system (GPS) microprocessor, which may be configured to receive and process global positioning signals and determine, with possible assistance from an external server and antenna, a geographic position of the node 103A.

The memory 253 may store computer-readable instructions that, when executed by one or more processors (e.g., the processor 251), may cause the node 103A to perform any of the functions described herein. The memory 253 may store, for example, a ledger 261. The ledger 261 may comprise, for example, the entirety or a portion of a blockchain of a distributed ledger system with which the integrity check service of a vehicle may determine the integrity of software and/or data stored on that vehicle. With the distributed ledger system comprising a plurality of computing devices (such as the vehicles 101A-101C and/or the nodes 103A-103C) for storing records used to validate the integrity of software and/or data stored on vehicles, the system described herein may mitigate the problem of a single point of failure, and may be more desirable from reliability and/or security standpoints.

Figure 3:
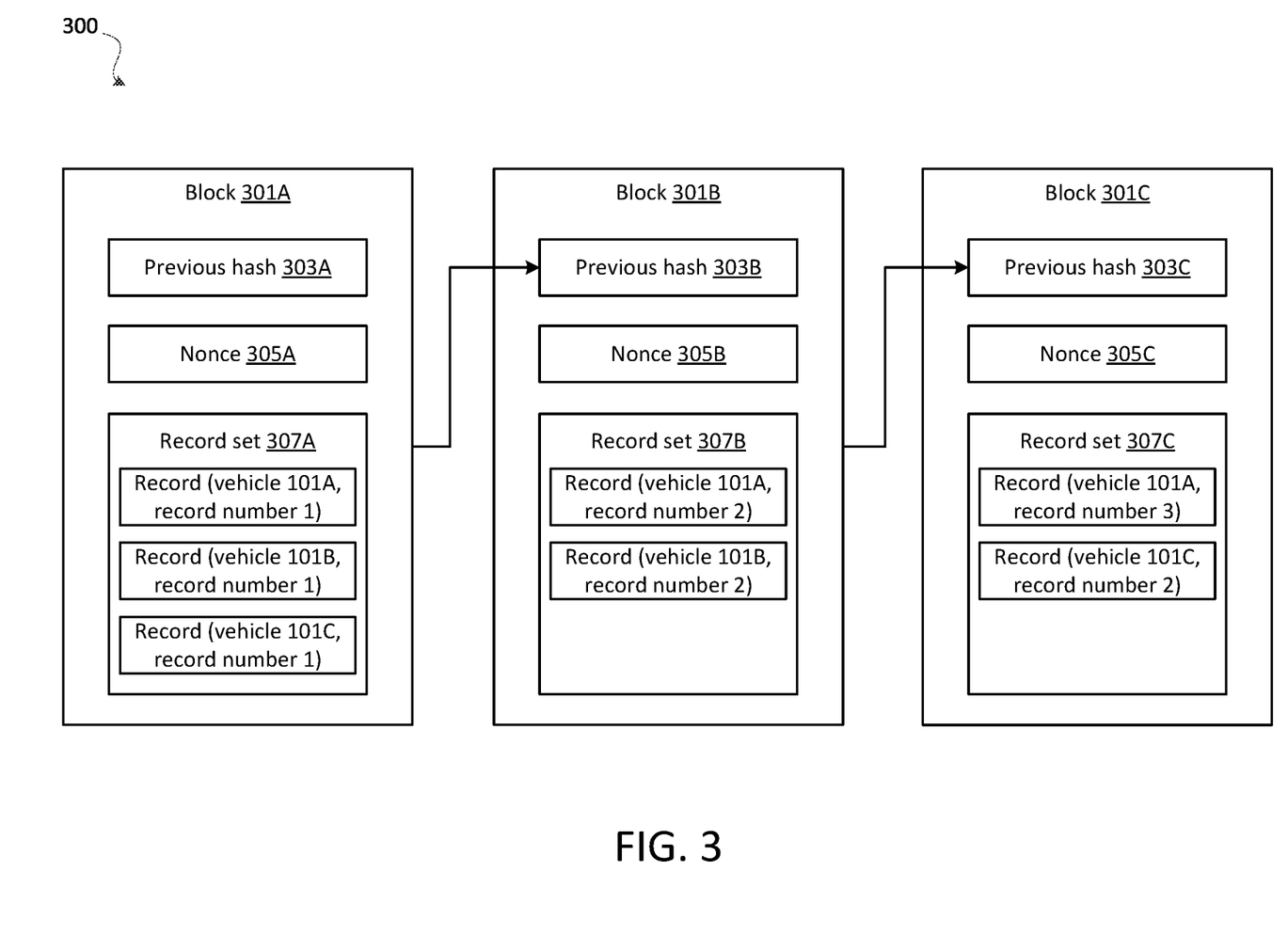
FIG. 3 shows an example blockchain with which various features described herein may be implemented.

FIG. 3 shows an example blockchain 300 with which various features described herein may be implemented. The blockchain 300 may comprise one or more blocks (e.g., blocks 301A-301C). The block 301A may be the first block of the blockchain 300, the block 301B may be the second block that is linked to the first block, and the block 301C may be the third block that is linked to the second block. The blockchain 300 may comprise additional or alternative blocks. A block of the blocks 301A-301C may comprise, for example, a previous hash, a nonce, and a record set. For example, the block 301A may comprise a previous hash 303A, a nonce 305A, and a record set 307A. The block 301B may comprise a previous hash 303B, a nonce 305B, and a record set 307B. The block 301C may comprise a previous hash 303C, a nonce 305C, and a record set 307C. The blockchain 300 may be in various other forms.

The vehicles 101A-101C and the nodes 103A-103C may operate in concert to create and maintain a distributed ledger system corresponding to the blockchain 300. For example, the vehicle 101A may generate a record for software and/or data installed onto the vehicle 101A in a factory or service depot. The record may comprise, for example, hash values that may be used to verify the integrity of the software and/or data stored on the vehicle 101A. An example of the record is further discussed in connection with FIG. 4. The vehicle 101A may request the distributed ledger system to store the record, for example, by sending (e.g., broadcasting) the record to the nodes 103A-103C and/or the other vehicles 101B-101C.

The nodes 103A-103C and/or the vehicles 101B-101C may receive, from the vehicle 101A, the record. To store the record in the blockchain 300 and maintain inter-nodal agreement as to the state of the blockchain 300, the nodes 103A-103C and/or the vehicles 101A-101C may execute a consensus algorithm. For example, the consensus algorithm may be proof of work, and the nodes 103A-103C and/or the vehicles 101A-101C may execute the proof-of-work algorithm to identify a numerical value (e.g., nonce). The nodes 103A-103C and/or the vehicles 101A-101C may determine a value for the nonce (e.g., randomly), and perform a hash function on a combination of the digest of the preceding block of the blockchain 300, the nonce, and a current record set (e.g., comprising the record from the vehicle 101A and/or records from other vehicles) or a digest of the record set. The nodes 103A-103C and/or the vehicles 101A-101C may keep selecting a different value for the nonce and performing the hash function, until a value for the nonce is identified such that the result produced by the hash function is in a predetermined alphanumerical format. The predetermined alphanumerical format may comprise a predetermined number of consecutive alphanumerical characters at predetermined positions within the produced result.

The node or vehicle of the nodes 103A-103C and/or the vehicles 101A-101C that identifies the nonce may create a new block to be added to the blockchain 300. The new block may comprise a block header (e.g., the digest of the preceding block), the identified nonce, and the record set (e.g., comprising the record from the vehicle 101A and/or records from other vehicles). The node or vehicle may send (e.g., broadcast) the new block to the other nodes and/or vehicles in the distributed ledger system. In some examples, the new block may be time stamped at a time corresponding to the addition to the blockchain 300. The nodes and/or vehicles in the distributed ledger system may accept the new block, and may work on creating a next block for the blockchain 300. After the new block has been added to the blockchain 300, the record from the vehicle 101A may be considered as being stored in the distributed ledger system. With the proof-of-work consensus algorithm, the majority decision may be represented by a longest chain, which may have the greatest proof-of-work effort invested in it. To modify a past block, an attacker may need to redo the proof-of-work (e.g., finding a new nonce) of the block and all blocks subsequent to the block and surpass the work of the honest nodes and/or vehicles. Thus, a consensus algorithm may help maintain inter-nodal agreement as to the state of the blockchain 300, and reduce the risk associated with an attacker tampering with the blockchain 300. Additionally or alternatively, the consensus algorithm may be proof of stake, delegated proof of stake, practical byzantine fault tolerance algorithm (PBFT), and/or any other type of consensus algorithm.

As shown in the example blockchain of FIG. 3, the previous hash 303B may correspond to the hash value of its preceding block 301A, and the previous hash 303C may correspond to the hash value of its preceding block 301B. The record set 307A may comprise, for example, a record corresponding to the vehicle 101A and record number one, a record corresponding to the vehicle 101B and record number one, and a record corresponding to the vehicle 101C and record number one. These records may respectively have been generated when the vehicles 101A-101C were configured with software and/or data for the first time (e.g., in a factory or service depot), and then stored in the blockchain 300.

The record set 307B may comprise, for example, a record corresponding to the vehicle 101A and record number two and a record corresponding to the vehicle 101B and record number two. These records may respectively have been generated, for example, when the software and/or data of the vehicles 101A-101B were updated (e.g., in a factory or service depot), and then stored in the blockchain 300.

The record set 307C may comprise, for example, a record corresponding to the vehicle 101A and record number three, which may have been generated, for example, when the software and/or data of the vehicle 101A were again updated (e.g., in a factory or service depot), and then stored in the blockchain 300. The record set 307C may additionally comprise, for example, a record corresponding to the vehicle 101C and record number two, which may have been generated, for example, when the software and/or data of the vehicle 101C were updated (e.g., in a factory or service depot), and then stored in the blockchain 300.

Figure 4:
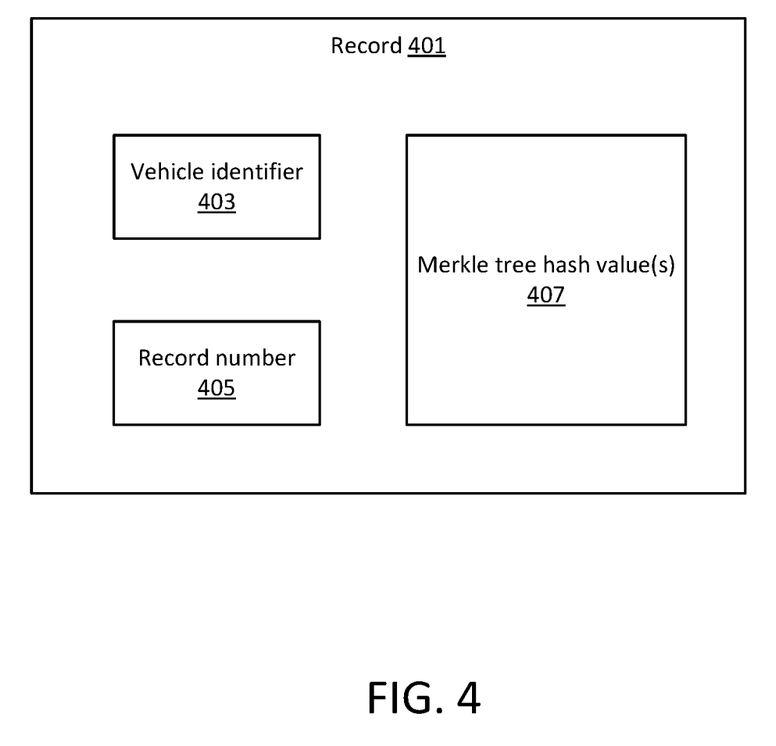
FIG. 4 shows an example of a record associated with a vehicle.

FIG. 4 shows an example of a record 401 associated with a vehicle. The record 401 may comprise, for example, a vehicle identifier 403, a record number 405, and/or Merkle tree hash value(s) 407. The record 401 may be generated when software and/or data of a vehicle are installed or updated, and may be stored in the blockchain of the distributed ledger system for verifying the integrity of the installed or updated software and/or data of the vehicle.

The vehicle identifier 403 may indicate the vehicle with which the record is associated. The record number 405 may indicate a version of software and/or data stored on the vehicle for which the record is generated. For example, if software and/or data are updated for a vehicle and a new record is generated for the vehicle, the record number in the new record may be incremented by one (1) from the record number in the preceding record for the vehicle. The Merkle tree hash value(s) 407 may indicate one or more hash values that may be used to verify the integrity of software and/or data stored on the vehicle. More details regarding the Merkle tree hash value(s) 407 are further described in connection with FIG. 5.

The record 401 may be encrypted using symmetric-key algorithms or asymmetric-key algorithms (e.g., when the record 401 is transmitted). With the encryption, a computing device in the distributed ledger system may determine whether the record was generated by an authorized user (e.g., an officer with a required level of security clearance working at a factory or service depot) or an unauthorized user (e.g., a hacker).

Figure 5:
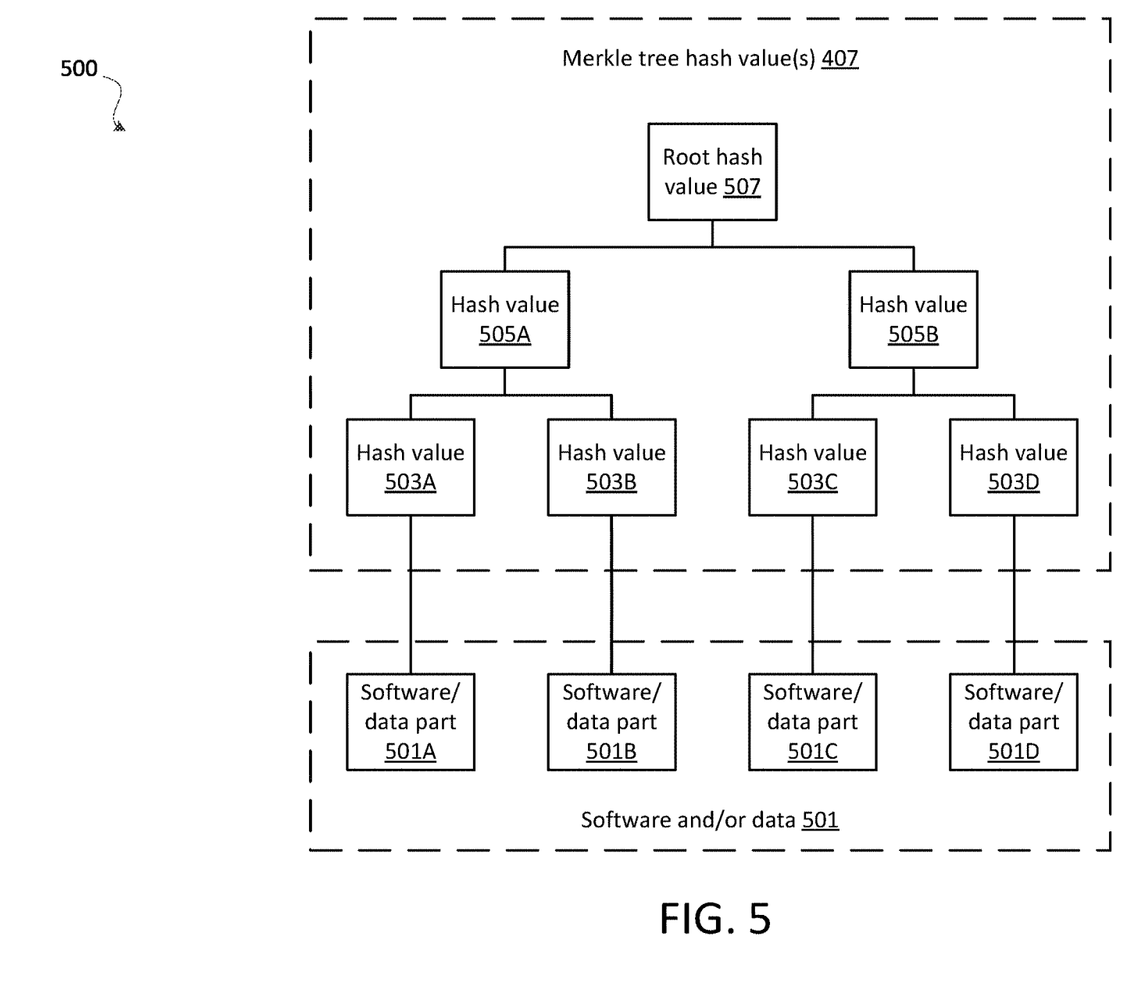
FIG. 5 shows an example data structure that may be used to implement various features described herein.

FIG. 5 shows an example data structure 500 that may be used to implement various features described herein. The data structure 500 may comprise Merkle tree hash value(s) 407 and software and/or data 501. In the Merkle tree 407, every leaf node may be labelled with the hash of a data block, and every non-leaf node may be labelled with the hash of the labels of its child nodes.

The software and/or data 501 may comprise, for example, software and/or data that are stored on a vehicle (e.g., the vehicle 101A). In some examples, if several pieces of software (e.g., Microsoft Word, Adobe Acrobat, software for controlling vehicle movement, software for controlling a weapon of the vehicle, etc.) and several pieces of data (e.g., identifier of the vehicle, information of a first vehicle operator, information of a second vehicle operator, etc.) are stored on a vehicle, the software and/or data 501 corresponding to the vehicle may comprise a combination of the pieces of software and the pieces of data. The software and/or data 501 may be separated into one or more software/data parts (e.g., software/data parts 501A-501D). The software/data parts 501A-501D may or may not contain overlapping information with each other.

The Merkle tree hash value(s) 407 may comprise one or more hash values (e.g., hash values 503A-503D, 505A-505B, 507). The hash values 503A-503D may respectively correspond to the output values of performing hash functions on the software/data parts 501A-501D. The hash value 505A may correspond to the output value of performing a hash function on the combination of the hash value 503A and the hash value 503B. The hash value 505B may correspond to the output value of performing a hash function on the combination of the hash value 503C and the hash value 503D. The root hash value 507 may correspond to the output value of performing a hash function on the combination of the hash value 505A and the hash value 505B. The data structure 500 may comprise additional or alternative software/data parts and/or hash values.

A Merkle tree (e.g., 407) may be used to verify the integrity of software and/or data. For example, a first Merkle tree may be generated for authenticated software and/or data, and a second Merkle tree may be generated for the software and/or data the integrity of which is to be determined. The root hash values of the two Merkle trees may be compared, and if they are the same, the integrity of the software and/or data corresponding to the second Merkle tree may be verified. If the root hash values are different, it may be determined that the software and/or data corresponding to the second Merkle tree have been compromised. Using the Merkle trees, a computing device may determine the compromised software/data part. For example, the computing device may recursively determine which lower level node of a higher level node of the second Merkle tree is different from a corresponding lower level node of a corresponding different higher level node of the first Merkle tree. In this manner, the computing device may identify one or more leaf nodes of the second Merkle tree that are different from one or more corresponding leaf nodes of the first Merkle tree. The computing device may determine that the software/data parts corresponding to the identified leaf nodes of the second Merkle tree may be compromised.

Figure 6A:
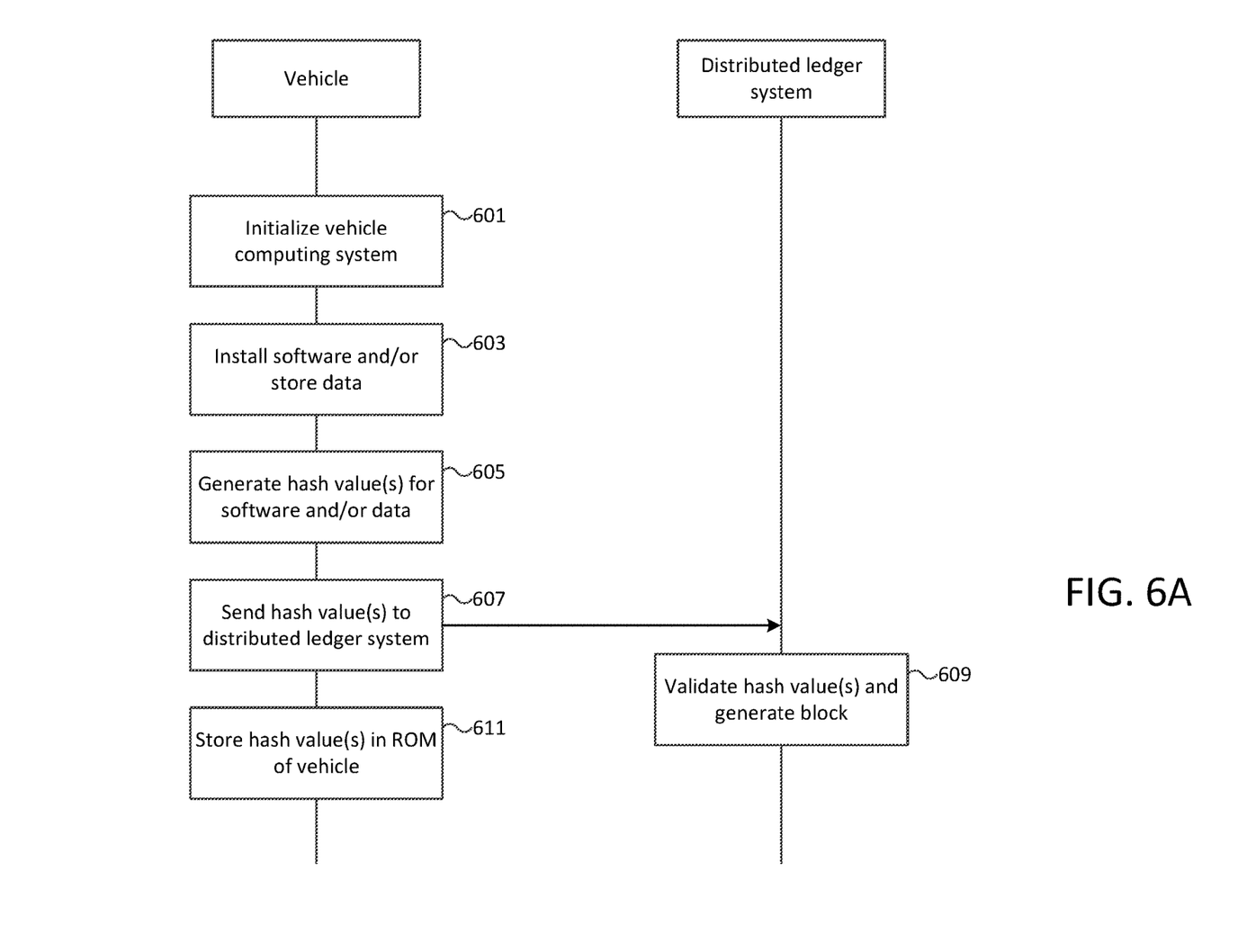
FIGS. 6A-6B is an example event sequence showing an example method for storing records in a distributed ledger system.
Figure 6B:
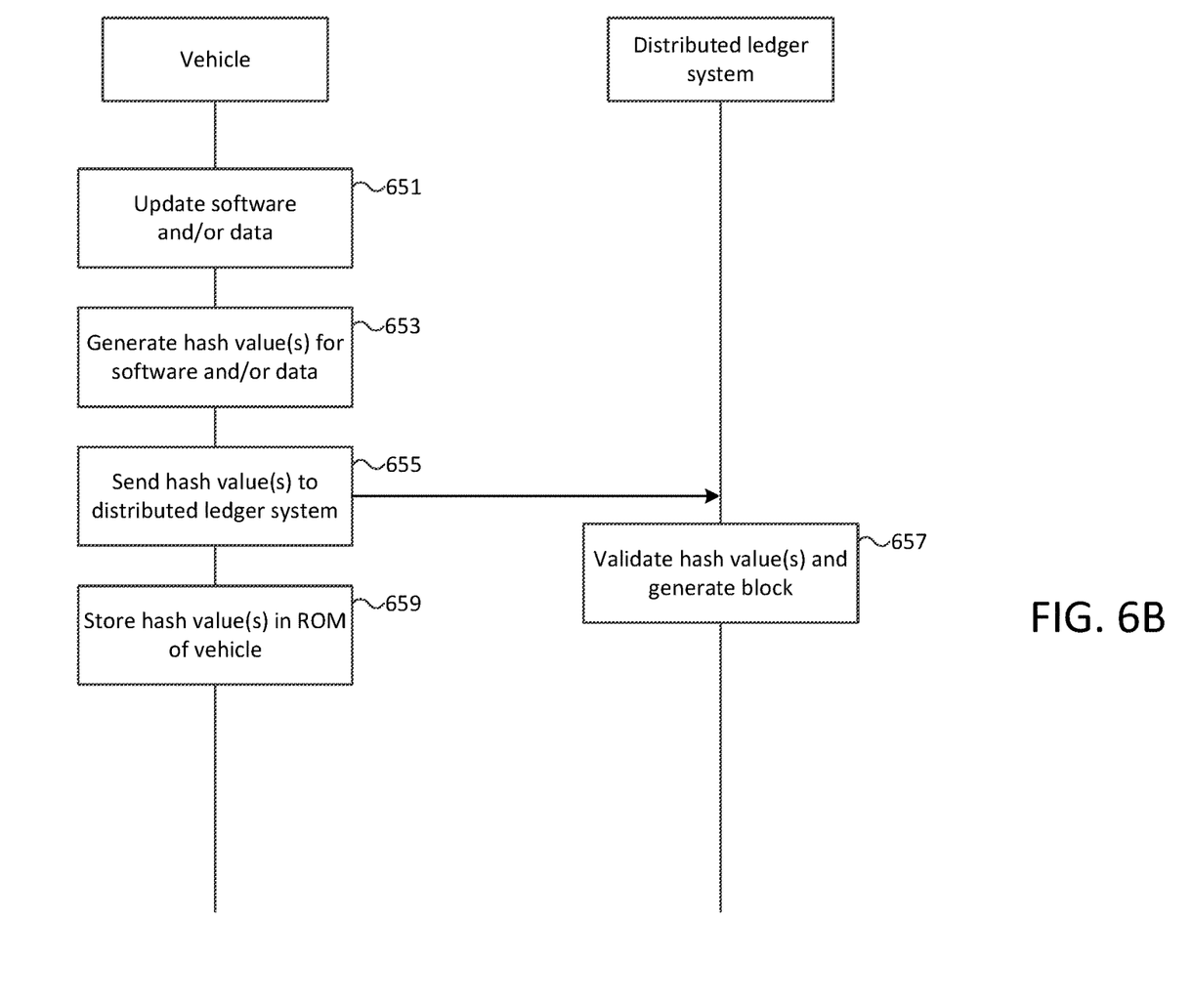

FIGS. 6A-6B is an example event sequence showing an example method for storing records in a distributed ledger system. While the steps of the event sequence are described in a particular order, the order of the steps may be altered without departing from the scope of the disclosure provided herein. Although the event sequence is described as being performed by a particular arrangement of computing systems, devices, and/or networks (e.g., a vehicle and a computing device in a distributed ledger system), the processes may be performed by a greater or smaller number of computing systems, devices, and/or networks, and/or by any type of computing system, device, and/or network.

In step 601, a vehicle (e.g., the vehicle 101A) may initialize the vehicle's computing system. The vehicle may comprise one or more processors and memory storing instructions that, when executed by the one or more processors, cause the vehicle to perform the functions described herein. When the vehicle is powered on, the one or more processors may start executing the instructions stored in the memory of the vehicle. For example, the vehicle may run an integrity check service (e.g., the integrity check service 211) stored in the memory of the vehicle.

In step 603, software and/or data may be installed or stored onto the vehicle. For example, when the vehicle is manufactured in a factory or service depot, software and/or data may be installed or stored onto the vehicle. The installed software may comprise, for example, executables, libraries, and/or other components. The installed software may, for example, be configured to perform functions for controlling operation of the vehicle. The stored data may be input in the factory or service depot, and may comprise, for example, an identifier of the vehicle (e.g., a bumper number of the vehicle, a serial number of the vehicle, a vehicle identification number (VIN) of the vehicle, etc.), information of the vehicle operator(s), and/or other data associated with the vehicle.

In step 605, the vehicle may generate hash value(s) for the software and/or data stored on the vehicle. For example, the integrity check service implemented on the vehicle may separate the software and/or data into a plurality of software/data parts, may perform a hash function on each of the software/data parts to generate a hash value for each of the software/data parts, and may generate a Merkle tree for the software and/or data stored on the vehicle as discussed in connection with FIG. 5.

In step 607, the vehicle may send the generated hash value(s) to a distributed ledger system. For example, the vehicle may send (e.g., broadcast) the generated hash value(s) to the nodes 103A-103C and/or other vehicles in the distributed ledger system. In some examples, the vehicle may send, to the distributed ledger system, a record comprising the generated hash value(s), such as the record 401. The record may additionally or alternatively comprise an identifier of the vehicle. Additionally or alternatively, the vehicle may include, in the record to be sent to the distributed ledger system, a record number. The record number may indicate a version of the software and/or data stored on the vehicle. If the software and/or data are installed onto the vehicle for the first time, then the record number may correspond to one (1). The vehicle may encrypt the hash value(s) and/or record to be sent to the distributed ledger system, using symmetric-key algorithms or asymmetric-key algorithms.

In step 609, the computing devices in the distributed ledger system, such as the nodes 103A-103C and/or the vehicles 101A-101C, may receive the hash value(s) and/or the record from the vehicle. The computing devices may verify, using the encryption algorithms, that the information is generated by, and received from, an authorized user, such as personnel of the factory or service depot, instead of a hacker. For example, in an asymmetric-key scenario, the received information may be encrypted using a private encryption key from an authorized user, and the computing devices may store a list of public decryption keys associated with authorized users. The computing devices may determine the authenticity of the received information, for example, if the computing devices successfully decrypt the received information using one of the list of public decryption keys. Additionally or alternatively, in a symmetric-key scenario, the received information may be encrypted using a private encryption key from an authorized user, and the computing devices may store a corresponding private decryption key. The computing devices may determine the authenticity of the received information, for example, if the computing devices successfully decrypt the received information using their private decryption key.

The computing devices of the distributed ledger system may work on generating a new block storing the received information, for example, after validating the authenticity of the received information. The generation of the new block and addition of the new block to the blockchain of the distributed ledger system may be performed in a similar manner as discussed in connection with FIG. 3.

In step 611, the vehicle may store the generated hash value(s) in the vehicle's ROM (e.g., the ROM 209). The vehicle's ROM may be configured in such a manner that it may be difficult to tamper or modify the hash value(s) stored therein after the hash value(s) are initially written to the ROM.

In step 651, the software and/or data stored on the vehicle may be updated. For example, the vehicle may return to the factory or service depot for the software and/or data update. In some examples, a piece of software stored on the vehicle (e.g., Microsoft Word) may be updated to a new version. In some examples, a new piece of software (e.g., Adobe Acrobat) may be installed onto the vehicle. In some examples, new components (e.g., a new weapon) may be added to the vehicle, and the software for controlling the new components may be installed onto the vehicle. In some examples, the vehicle may be repurposed, and new software may be installed, replacing the existing software. In some examples, the data stored on the vehicle may be updated. For example, the authorized operators of the vehicle may be changed, and the operator information stored on the vehicle may be modified accordingly.

In step 653, the vehicle may generate hash value(s) for the updated software and/or data. The generation of the hash value(s) for the updated software and/or data may be performed in a similar manner as discussed in connection with step 605. For example, the vehicle may generate a Merkle tree for the updated software and/or data.

In step 655, the vehicle may send, to the distributed ledger system (e.g., including the nodes 103A-103C and/or other vehicles), the generated hash value(s) for the updated software and/or data. In some examples, the vehicle may send a record comprising the generated hash value(s) for the updated software and/or data, such as the record 401. The record may additionally or alternatively comprise an identifier of the vehicle. Additionally or alternatively, the vehicle may include, in the record to be sent to the distributed ledger system, a record number. The record number may indicate a version of the software and/or data stored on the vehicle. If the software and/or data are installed onto the vehicle for the second time, then the record number may correspond to two (2). In some examples, the vehicle may determine the record number for the current record by querying the distributed ledger system and identifying the record number in the most recent record associated with the vehicle. The record number for the current record may correspond to the record number in the most recent record plus one (1). The vehicle may encrypt the hash value(s) and/or record to be sent to the distributed ledger system, using symmetric-key algorithms or asymmetric-key algorithms.

In step 657, the computing devices in the distributed ledger system, such as the nodes 103A-103C and/or the vehicles 101A-101C, may receive the hash value(s) and/or the record from the vehicle. The computing devices may verify, using the encryption algorithms, that the information is generated by, and received from, an authorized user, such as personnel of the factory or service depot, instead of a hacker. The computing devices of the distributed ledger system may work on generating a new block storing the received information, for example, after validating the authenticity of the received information. The generation of the new block and addition of the new block to the blockchain of the distributed ledger system may be performed in a similar manner as discussed in connection with FIG. 3.

In step 659, the vehicle may store the generated hash value(s) for the updated software and/or data in the vehicle's ROM. The vehicle's ROM may have been written with the hash value(s) previously generated (e.g., in step 605). A new ROM may be used to replace the existing ROM of the vehicle. And the hash value(s) for the updated software and/or data may be stored onto the new ROM.

Figure 7:
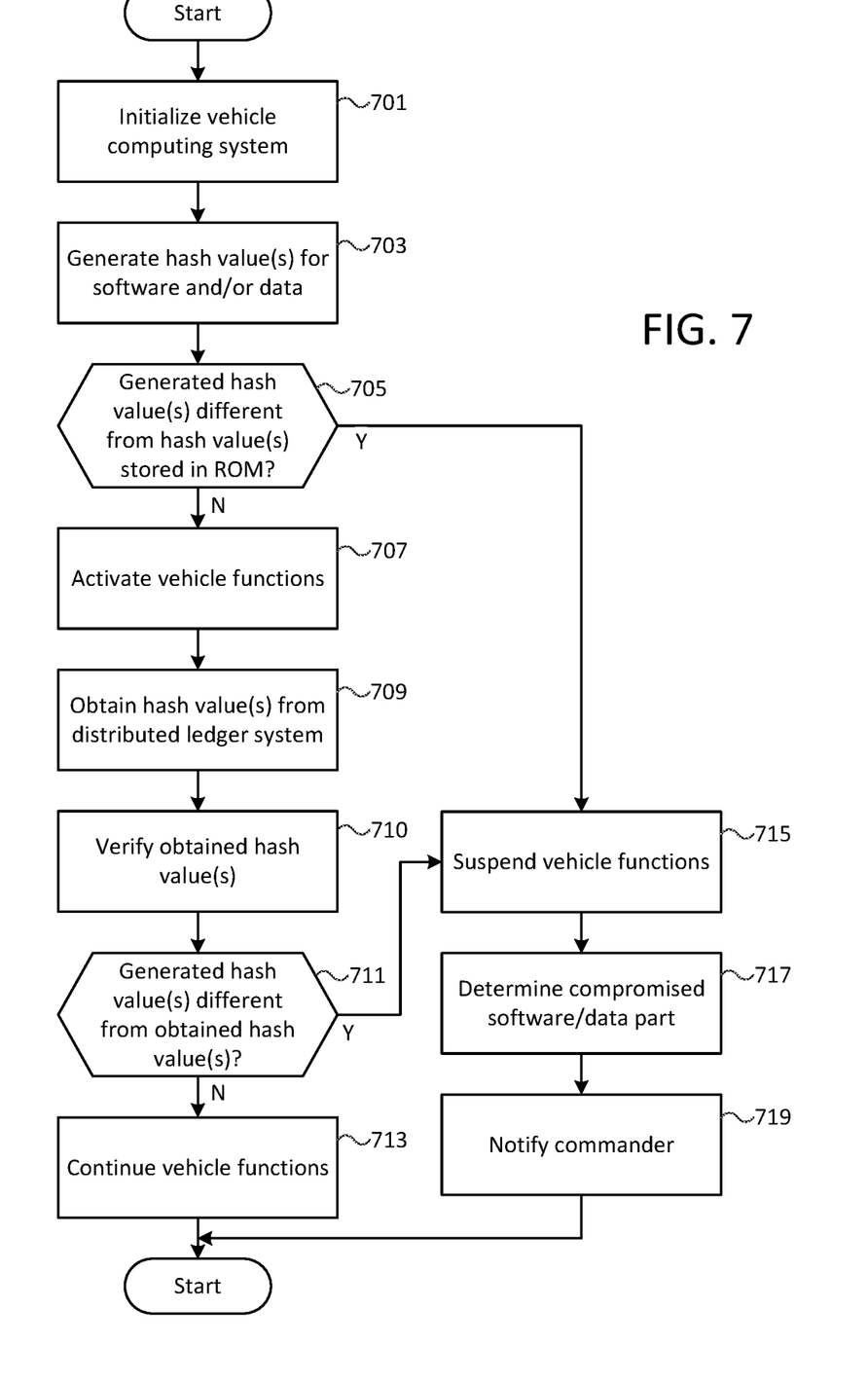
FIG. 7 is an example flowchart showing an example method for validating the integrity of software and/or data stored on a vehicle.

FIG. 7 is an example flowchart showing an example method for validating the integrity of software and/or data stored on a vehicle. The method may be performed, for example, by the system as described in connection with FIG. 1 (e.g., a vehicle of the vehicles 101A-101C). The steps of the example method may be described as being performed by particular computing devices for the sake of simplicity, but the steps may be performed by any computing device.

In step 701, a vehicle (e.g., the vehicle 101A) may initialize the vehicle's computing system. The vehicle may comprise one or more processors and memory storing instructions that, when executed by the one or more processors, cause the vehicle to perform the functions described herein. For example, when the vehicle is powered on (e.g., by a user of the vehicle), the one or more processors may start executing the instructions stored in the memory of the vehicle. For example, the vehicle may run an integrity check service (e.g., the integrity check service 211) stored in the memory of the vehicle.

In step 703, the vehicle may generate hash value(s) for the software and/or data stored on the vehicle. For example, the integrity check service implemented on the vehicle may separate the software and/or data into a plurality of software/data parts, may perform a hash function on each of the software/data parts to generate a hash value for each of the software/data parts, and may generate a Merkle tree for the software and/or data stored on the vehicle as discussed in connection with FIG. 5.

In step 705, the vehicle may determine whether the generated hash value(s) are different from the hash value(s) stored in the vehicle's ROM. In some examples, a Merkle tree may be generated for the software and/or data stored on the vehicle, and a corresponding Merkle tree may be stored in the vehicle's ROM. In such a situation, the vehicle may compare the root hash values of the Merkle trees, and may determine whether they are different. If the generated hash value(s) are different from the hash value(s) stored in the vehicle's ROM (step 705: Y), the method may proceed to step 715.

If the generated hash value(s) are not different from the hash value(s) stored in the vehicle's ROM (step 705: N), the method may proceed to step 707. In step 707, the vehicle may activate vehicle functions. The determination that the generated hash value(s) are not different from the hash value(s) stored in the vehicle's ROM indicates that the software and/or data stored on the vehicle have not been tampered if the hash value(s) stored in the vehicle's ROM have not been compromised. The hash value(s) stored in the vehicle's ROM were populated, for example, when the vehicle was in a factory or service depot, based on authentic software and/or data from authorized personnel of the factory or service depot. Assuming the hash value(s) stored in the vehicle's ROM have not been changed since they were first populated in the vehicle's ROM, which is configured to be tamper-resistant, the determination that the hash value(s) as generated in step 703 are not different from the hash value(s) stored in the vehicle's ROM may indicate that the software and/or data stored on the vehicle have not been changed or modified since the software and/or data were installed, for example, in a factory or service depot. In response to the determination, the vehicle may execute the software stored on the vehicle. For example, one or more processors of the vehicle may execute the executables of the software, and may read the libraries of the software. The vehicle may also use the data stored on the vehicle for any desired purposes.

In step 709, the vehicle may obtain, from the distributed ledger system, hash value(s) associated with the vehicle (e.g., during runtime of the vehicle after the vehicle starts to use the software and/or data stored on the vehicle). For example, the vehicle may send, to one or more computing devices in the distributed ledger system (e.g., the nodes 103A-103C and/or other vehicles), a request for the hash value(s) associated with the vehicle. For example, the vehicle may query the one or more computing devices to obtain the most recent record associated with the vehicle. In some examples, the hash value(s) may comprise a Merkle tree, and the vehicle may send, to the one or more computing devices, a request for the root hash value of the Merkle tree associated with the vehicle. In this manner, network traffic may be reduced and efficiency of the system may be improved.

In step 710, the vehicle may verify that the obtained hash value(s) associated with the vehicle are authentic as agreed on by the nodes and/or vehicles in the distributed ledger system. For example, the vehicle may send, to multiple computing devices in the distributed leger system (e.g., some or all of the computing devices in the distributed ledger system), requests for the hash value(s), and may determine whether the received versions of the hash value(s) from the multiple computing devices are different. If the received versions of the hash value(s) from the multiple computing devices are not different, the vehicle may determine that the received hash value(s) are authentic as agreed on by the nodes and/or vehicles in the distributed ledger system, and may use the received hash value(s) for subsequent processing.

If the received versions of the hash value(s) from the multiple computing devices are different, the vehicle may resolve the conflict, and may determine a particular version, of the different versions, to be used for subsequent processing. The vehicle may resolve the conflict in a manner depending on the consensus algorithm used by the distributed ledger system. In some examples, the distributed ledger system may use a one-computing-device-one-vote consensus algorithm. In such a scenario, the vehicle may send, to all of the computing devices in the distributed ledger system, requests for the hash value(s), and may determine a version, of the hash value(s), as received from the majority of the computing devices. In some examples, the distributed ledger system may use a proof-of-work consensus algorithm. In such a scenario, the vehicle may query the computing devices in the distributed ledger system for a longest blockchain, and may use the hash value(s) stored in the longest blockchain for subsequent processing.

In some examples, the vehicle may determine a level of agreement, among the computing devices in the distributed ledger system, as to the state of the blockchain of the distributed ledger system. Based on the level of agreement, the vehicle may determine whether to alert a commander or other parties associated with the vehicle. For example, in a one-computing-device-one-vote system, the level of agreement may correspond to a percentage between the quantity of the majority of the computing devices in the distributed ledger system and the quantity of all of the computing devices in the distributed ledger system. In a proof-of-work system, the level of agreement may correspond to a difference between the length of the longest chain in the distributed ledger system and the length of a different, second longest chain in the distributed ledger system.

The vehicle may determine whether the level of agreement satisfies (e.g., meets, exceeds, etc.) a particular threshold. If the level of agreement satisfies the threshold, the vehicle may determine that the distributed ledger system is likely not being tampered with by attacker(s) to an alarming degree, and may continue with subsequent processing (e.g., proceed to step 711). If the level of agreement does not satisfy the threshold, the vehicle may determine that the distributed ledger system is likely being tampered with by attacker(s) to an alarming degree, and may, for example, suspend the functions associated with the vehicle and/or notify the commander or other parties associated with the vehicle. The threshold may be set to any desired degree, and may be adjusted, for example, by the commander. In some examples, for enhanced security, the vehicle may suspend functions associated with the vehicle and/or notify the commander or other parties associated with the vehicle if the vehicle notices any disagreement among the computing devices in the distributed ledger system.

In step 711, the vehicle may determine whether the hash value(s) generated in step 703 are different from the hash value(s) obtained in step 709. In some examples, Merkle trees may be used, and the vehicle may determine whether the root hash values of the Merkle trees are different. If the generated hash value(s) are not different from the obtained hash value(s) (step 711: N), the method may proceed to step 713. In step 713, vehicle may continue performing its various functions (e.g., continue executing the software and/or using the data). If the generated hash value(s) are different from the obtained hash value(s) (step 711: Y), the method may proceed to step 715.

In step 715, the vehicle may suspend the vehicle functions. For example, the vehicle may stop executing the software stored on the vehicle, and may stop using the data stored on the vehicle. In step 717, the vehicle may determine the compromised software/data part. The vehicle may make this determination in a similar manner as discussed in connection with FIG. 5. For example, if the vehicle determines that the hash value(s) generated in step 703 (e.g., a Merkle tree for software and/or data the integrity of which is to be verified) are different from the hash value(s) stored in the vehicle's ROM (e.g., a Merkle tree for authenticated software and/or data), the vehicle may use the Merkle trees to identify the compromised software/data part (e.g., in a similar manner as discussed in connection with FIG. 5). Additionally or alternatively, if the vehicle determines that a root hash value of a Merkle tree generated in step 703 is different from a root hash value of a Merkle tree stored in the distributed ledger system (step 711: Y), the vehicle may send, to the computing devices in the distributed ledger system, a request for the entire Merkle tree associated with the vehicle. The vehicle may use the Merkle tree generated in step 703 and the Merkle tree obtained from the distributed ledger system to determine the compromised software/data part (e.g., in a similar manner as discussed in connection with FIG. 5).

In step 719, the vehicle may notify a commander associated with the vehicle that the software and/or data stored on the vehicle has been compromised, and the vehicle may notify the commander of the determined comprised software/data part. The notifications may allow the commander to investigate the vehicle.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device of a first vehicle and based on a hashing of information stored on the computing device of the first vehicle, a first hash value;
   receiving, from read-only memory associated with the first vehicle, a second hash value;
   based on determining that the first hash value corresponds to the second hash value:
      performing, based on the information stored on the computing device of the first vehicle, an operation associated with the first vehicle; and
      sending, by the computing device of the first vehicle and to a computing device of a second vehicle, a request for a third hash value associated with the first vehicle;
   receiving, by the computing device of the first vehicle and from the computing device of the second vehicle, the third hash value; and
   determining, by the computing device of the first vehicle and based on the first hash value and the third hash value, whether to continue the operation.

2. The method of claim 1, wherein each of the computing device of the first vehicle and the computing device of the second vehicle stores at least a portion of a blockchain of a distributed ledger system.

3. The method of claim 1, further comprising:
   receiving information input to the computing device of the first vehicle;
   determining, based on hashing the input information, the third hash value; and
   registering, to the computing device of the second vehicle, the third hash value.

4. The method of claim 3, wherein the registering the third hash value comprises sending, to the computing device of the second vehicle, a record comprising:
   the third hash value; and
   an identifier of the first vehicle.

5. The method of claim 1, wherein the information stored on the computing device of the first vehicle comprises software, and the performing the operation associated with the first vehicle comprises executing the software.

6. The method of claim 1, further comprising:
   based on determining that the first hash value corresponds to the third hash value, continuing the operation associated with the first vehicle.

7. The method of claim 1, further comprising:
   based on determining that the first hash value is different from the third hash value, suspending the operation associated with the first vehicle.

8. The method of claim 1, further comprising:
   receiving, from a computing device of a third vehicle, a fourth hash value associated with the first vehicle; and
   verifying, based on the fourth hash value, the third hash value.

9. The method of claim 1, further comprising:
   receiving, from a computing device of a third vehicle, a fourth hash value associated with the first vehicle; and
   based on determining that the fourth hash value is different from the third hash value, determining a version, of a hash value associated with the first vehicle, as agreed to by other vehicles.

10. The method of claim 1, further comprising:
    receiving, from a computing device of a third vehicle, a fourth hash value associated with the first vehicle; and
    based on determining that the fourth hash value is different from the third hash value, suspending the operation associated with the first vehicle.

11. The method of claim 1, further comprising:
    based on the determining that the first hash value corresponds to the second hash value, sending, by the computing device of the first vehicle and to a computing device of a third vehicle, a request for a fourth hash value associated with the first vehicle; and
    receiving, by the computing device of the first vehicle and from the computing device of the third vehicle, the fourth hash value;
    wherein the determining whether to continue the operation is further based on the fourth hash value.

12. A system comprising:
    a first vehicle; and
    a computing device, of the first vehicle, comprising one or more processors and memory, the memory storing instructions that, when executed by the one or more processors, cause the computing device of the first vehicle to:
       determine, based on a hashing of information stored on the computing device of the first vehicle, a first hash value;

receive, from read-only memory associated with the first vehicle, a second hash value;

based on determining that the first hash value corresponds to the second hash value:

perform, based on the information stored on the computing device of the first vehicle, an operation associated with the first vehicle; and send, to a computing device of a second vehicle, a request for a third hash value associated with the first vehicle;

receive, from the computing device of the second vehicle, the third hash value; and determine, based on the first hash value and the third hash value, whether to continue the operation.

13. The system of claim 12, wherein each of the computing device of the first vehicle and the computing device of the second vehicle stores at least a portion of a blockchain of a distributed ledger system.

14. The system of claim 12, wherein the instructions, when executed by the one or more processors, further cause the computing device of the first vehicle to:

receive information input to the computing device of the first vehicle;

determine, based on hashing the input information, the third hash value; and register, to the computing device of the second vehicle, the third hash value.

15. The system of claim 12, wherein the instructions, when executed by the one or more processors, further cause the computing device of the first vehicle to:

receive, from a computing device of a third vehicle, a fourth hash value associated with the first vehicle; and based on determining that the fourth hash value is different from the third hash value, determine a version, of a hash value associated with the first vehicle, as agreed to by other vehicles.

16. The system of claim 12, wherein the instructions, when executed by the one or more processors, further cause the computing device of the first vehicle to:

receive, from a computing device of a third vehicle, a fourth hash value associated with the first vehicle; and based on determining that the fourth hash value is different from the third hash value, suspend the operation associated with the first vehicle.

17. One or more non-transitory computer-readable media storing instructions that, when executed by one or more processors, cause a computing device of a first vehicle to:

determine, based on a hashing of information stored on the computing device of the first vehicle, a first hash value;

receive, from read-only memory associated with the first vehicle, a second hash value;

based on determining that the first hash value corresponds to the second hash value:

perform, based on the information stored on the computing device of the first vehicle, an operation associated with the first vehicle; and send, to a computing device of a second vehicle, a request for a third hash value associated with the first vehicle;

receive, from the computing device of the second vehicle, the third hash value; and determine, based on the first hash value and the third hash value, whether to continue the operation.

18. The one or more non-transitory computer-readable media of claim 17, wherein each of the computing device of the first vehicle and the computing device of the second vehicle stores at least a portion of a blockchain of a distributed ledger system.

19. The one or more non-transitory computer-readable media of claim 17, wherein the instructions, when executed by the one or more processors, further cause the computing device of the first vehicle to:

receive, from a computing device of a third vehicle, a fourth hash value associated with the first vehicle; and based on determining that the fourth hash value is different from the third hash value, determine a version, of a hash value associated with the first vehicle, as agreed to by other vehicles.

20. The one or more non-transitory computer-readable media of claim 17, wherein the instructions, when executed by the one or more processors, further cause the computing device of the first vehicle to:

receive, from a computing device of a third vehicle, a fourth hash value associated with the first vehicle; and based on determining that the fourth hash value is different from the third hash value, suspend the operation associated with the first vehicle.

* * * * *